United States Patent Office 2,781,258
Patented Feb. 12, 1957

2,781,258
METAL-WORKING TOOL

Antoni Niedzwiedzki, Grivegnee-lez-Liege, Belgium

No Drawing. Application April 8, 1952,
Serial No. 281,275

Claims priority, application Belgium April 9, 1951

2 Claims. (Cl. 75—123)

This invention relates to metal-working tools such as tools used on machine tools and has for its primary object to provide as a new article of manufacture an improved metal-working tool possessing a very high resistance to wear due to friction and simultaneously a number of valuable workshop qualities such as increased output and reduction of lubrication requirements.

Another object of the invention is to provide a new or improved metal-working tool of homogeneous or heterogeneous structure the constitutive material of which contains one or more bodies or compounds capable of behaving so as to remain free from welding or coalescence with said material and/or with the metal of the part being worked.

A further object of the invention is to provide a metal-working tool or contrivance as aforesaid wherein the adjunctive body or bodies contained in at least a portion of the material of which the tool is made (for example in its cutting portion) is or are in the form of uniformly distributed fine inclusions, the latter counteracting the trend to the formation of solid solutions with said material and with the metal being worked.

A still further object of the invention is to provide a method for producing a tool as aforesaid, said method comprising the essential step of encysting in the particles of the mass of metal adapted to form the tool a very large number of fine particles of one or more bodies or compounds selected among those which are inapt to become welded with the tool material or metal and with the metal of which the part being wrought is made.

With these and such other objects in view as will incidentally appear hereafter, the invention comprises the novel features and combination of features that are described hereafter and are more particularly pointed out in the appended claims.

A tool for working metals such for instance as a tool utilizable on a machine tool as used in the industry for various machining operations is characterized according to the invention by the fact that at least a portion of its constitutive material, for example high speed steel or sintered carbide, contains one or several adjunctive bodies or compounds selected owing to its or to their qualities for checking or counteracting the formation of solid metal solutions with said material and/or with the metal of the work being wrought and consequently for being inapt to become welded by contact with said material and metal.

According to other features of the invention, the adjunctive body or bodies (this word being used in a broad sense) is or are in the form of small inclusions imbedded or encysted in the crystalline solution of the tool material e. g. throughout the mass of steel of which the tool is made or throughout a portion only of said mass.

Preferably the proportions of the adjunctive body or bodies imbedded as uniformly distributed fine inclusions throughout the mass of material of which the tool is made range from one tenth percent to one percent (.1% to 1%) by weight.

As above stated, the inclusions may comprise one or several adjunctive bodies or compounds. Among those which are capable of being particularly advantageous so far as the results are concerned may be mentioned lead sulphide, manganese sulphide, molybdenum sulphide, lead, zinc, silver, tellurium and selenium.

This list is not limitative. Bodies made of antimony, phosphorus or bismuth might be used.

The inclusions are preferably obtained throughout the mass of the tool or at least of the active or operative portion or portions (for example the cutting portion) of the tool by a metallurgical process. Where the tool is constituted for instance by alloy steel or high-speed steel, the adjunctive body or bodies may be admixed with the mass of molten steel at the very moment of casting, for example die casting. Where, alternatively, the tool is made from a sintered powder, the adjunctive body or bodies as above-stated may be homogeneously mixed with the powder used for the manufacture of sintered tips and bodies.

It will be understood from the foregoing that a metal-working tool according to the invention has at least a portion of its constitutive material (for example the portion constituting its integral or separate cutting edge portion) made of this material in which are uniformly distributed or interspersed fine inclusions obtained by encysting in the tool metal mass very small particles of at least one body selected owing to its qualities for checking or counteracting the formation of solid solutions with the material (for example steel) of which the tool is made and also with the metal of the part being worked or in other words owing to its inaptness to coalesce or become contact welded with said material or metal, thereby staving off the risk of abrasion due to welding or seizing of the tool thus made.

A tool made according to the invention has a much longer service time and greater resistance to wear than usually made tools while possessing additional and valuable qualities such as a higher efficiency especially while working metals of poor machinability, a reduced requirement for lubrication and cooling during operation and increased manufacturing facilities.

Expressed in other words, the novel tool according to the invention has such a structure that it shows lower "contact weldability" with the metal of which the major portion of its mass is constituted and also with the metal of the work subjected to the action of the tool. It is this reduced "contact weldability" which accounts for the better results as above specified.

Minor details in which the tool may be carried out industrially can be varied without departing from the scope of the subjoined claims.

I claim:

1. As an article of manufacture a metal working tool for machine tool operations including cutting, turning, boring, reaming, milling, drilling, threading and the like, comprising a tool body having at least its working face portion consisting of an alloy steel substantially free of abrasive oxides and containing sulphur in the form of particles of lead sulphide present in an amount between .1 percent and 1 percent, said working face portion being characterized by having at least a portion of the sulphide homogeneously distributed throughout the alloy steel as soft, non-abrasive crystalline inclusions non-weldable with the said alloy steel and said working face portion further having substantially reduced contact weldability as compared with a tool having its working face portion made from the same steel without the particles of metallic sulphide compound.

2. As an article of manufacture, a metal working tool for machine tool operations including cutting, turning, boring, reaming, milling, drilling, threading and the like, comprising a tool body having at least its working face portion consisting of an alloy steel substantially free of abrasive oxides and containing sulphur in the form of particles of a metallic sulphide selected from the group consisting of lead sulphide, molybdenum sulphide and manganese sulphide present in an amount between .1 percent and 1 percent, said working face portion being characterized by having at least a portion of the sulphide homogeneously distributed throughout the alloy steel as soft, non-abrasive crystalline inclusions non-weldable with the said alloy steel and said working face portion further having substantially reduced contact weldability as compared with a tool having its working face portion made from the same steel without the particles of metallic sulphide compound.

References Cited in the file of this patent

UNITED STATES PATENTS

| | | |
|---|---|---|
| 1,252,596 | McMullin | Jan. 8, 1918 |
| 1,345,732 | Arnold | July 6, 1920 |
| 1,941,547 | French | Jan. 2, 1934 |
| 1,956,645 | Langenberg | May 1, 1934 |
| 2,075,990 | Kelly | Apr. 6, 1937 |
| 2,157,673 | Ridgley | May 9, 1939 |
| 2,182,758 | Harder | Dec. 5, 1939 |
| 2,224,595 | Dawihl et al. | Dec. 10, 1940 |
| 2,327,561 | Russel et al. | Aug. 24, 1943 |
| 2,367,407 | Kott | Jan. 16, 1945 |